United States Patent
Key et al.

(10) Patent No.: US 6,725,210 B1
(45) Date of Patent: Apr. 20, 2004

(54) PROCESS DATABASE ENTRIES TO PROVIDE PREDICTIONS OF FUTURE DATA VALUES

(75) Inventors: Jane Key, London (GB); Say Beng Tan, Singapore (SG)

(73) Assignee: NCR Corporation, Dayton, OH (US)

( * ) Notice: Subject to any disclaimer, the term of this patent is extended or adjusted under 35 U.S.C. 154(b) by 548 days.

(21) Appl. No.: 09/713,368

(22) Filed: Nov. 15, 2000

(30) Foreign Application Priority Data

Nov. 20, 1999 (GB) ............................................. 9927371

(51) Int. Cl.$^7$ ........................... G06F 17/00; G06F 17/60
(52) U.S. Cl. ............................................ 706/45; 706/50
(58) Field of Search ...................................... 706/45–60

(56) References Cited

U.S. PATENT DOCUMENTS

| | | | | |
|---|---|---|---|---|
| 5,855,011 A | * | 12/1998 | Tatsuoka | 706/45 |
| 6,260,033 B1 | * | 7/2001 | Tatsuoka | 706/45 |
| 6,301,571 B1 | * | 10/2001 | Tatsuoka | 706/45 |
| 6,601,055 B1 | * | 7/2003 | Roberts | 706/45 |

OTHER PUBLICATIONS

Classification and Regression: (the most common types of problems to which data mining is applied) DBMS, Brand, Estelle; Gerriitsen, vol. 11, No. 9, Aug. 1998, pp. 56–64.*
Bayesian Methods for Intelligent Data Analysis, Marco Ramoni; Paola Sebastiani (Knowledge Media Institute) Jul. 1998, KMI–TR–67.*
DMBS, vol. 11, No. 9, Aug. 1998, Estelle Brand et al., "Classification and Regression", p. 56.
Marco Ramoni et al., "Bayesian Methods for Intelligent Data Analysis", published Jul. 1998, Knowledge Media Institute.

* cited by examiner

*Primary Examiner*—Anil Khatri
*Assistant Examiner*—Michael B. Holmes
(74) *Attorney, Agent, or Firm*—Priest & Goldstein PLLC

(57) ABSTRACT

The present invention relates to a method and apparatus for processing entries stored in an electronic database where each entry comprises a succession of data values of correlated variables. The entries are processed in order to provide predictions of future data values of the correlated variables. The invention has particular application to processing data entries that relate to customers of a bank or retail business so as to predict future data values of attributes of the customers. A prior distribution over the parameters of a first of the variables is accessed from the database and data values of the first variable are used to derive a posterior distribution of the parameters of the first variable. A prior distribution over the parameters of a second of the variables is accessed from the database, the second of the variables being correlated with the first. Data values of the second variable are accessed to derive a posterior distribution of the parameters of the second variable. A statistical sampler samples the parameters of each posterior distribution to provide estimates of the parameters of the posterior distributions. Predictive distributions of the first and second variables are computed from the estimates. Predicted data values for the first and second correlated variables are then formulated from the predictive distributions and known values for the variables.

18 Claims, 4 Drawing Sheets

PROCESS DATABASE ENTRIES TO PROVIDE PREDICTIONS OF FUTURE DATA VALUES

BACKGROUND OF THE INVENTION

The present invention relates to a method and apparatus for processing entries stored in an electronic database where each entry comprises a succession of data values of correlated variables. The entries are processed in order to provide predictions of future data values of the correlated variables. The invention has particular application to processing data entries that relate to customers of a bank or retail business so as to predict future data values of attributes of the customers. The future profitability of each customer may then be calculated by reference to the predicted values for the customer attributes.

Businesses need to know the value to them of individual customers who conduct business transactions. Such transactions take place over time and as a result a pattern of transactions can be observed in relation to each customer. The products and facilities that are offered by a business may cover a wide spectrum and each product may have its individual overhead costs of provision and profitability. For example, in a bank, the products and facilities on offer will include current and savings accounts, financial equity investment products, stock market investment management, insurance products and lending products such as home purchase and business loans. In addition, customers will interact with the bank through personal contact at branches of the bank, telephone instructions, and automated teller machine transactions.

An individual facility such as a current account has an overhead cost to a bank that depends upon the number and type of transactions that pass through the account and the balance within the account. The bank will be able to determine a cost to be assigned to each account transaction whether it is processing a check or a cash withdrawal from an automated teller machine. On the other hand, the bank can also determine any profit from charging interest when an account is in deficit or the use of funds when the account is in credit. An individual customer of the bank may have accepted other financial products such as a loan or an insurance product and the profitability of that customer will depend on the number, the type and the value of those products.

Some customers will be seen as more profitable than others because of the pattern of their financial relationship with the bank. A bank will have been able to develop a profitability algorithm which relates the profit v(t) for a customer at any one time t to a number of variables relating to that customer. The variables may include continuous variables X such as a bank account balance and discrete variables Y such as a number of credit card transactions. Personal attributes that are explanatory of the customer, such as age, sex, occupation or address may be included in the data relating to each customer although they do not contribute directly to the algorithm of profitability used by the bank.

In general terms the algorithm may be expressed as $$v(t)=G(X(t),Y(t)) \qquad (1)$$

where v(t) represents the profitability of the customer at time t, G is a mathematical function defined by the bank, X represents a continuous variable such as an account balance and Y represents a discrete variable such as a number of credit card transactions. It will be understood that for simplicity of explanation it has been assumed that only two variables have been taken into account in equation (1). In practice, the bank will take more than two variables into account.

It would be beneficial to a bank to be able to make a projection of the future profitability of a customer using the bank's algorithm. Such a projection to a future time (t+1) would however require predictions of the future values of the variables X and Y at the future time (t+1). It is an aim of the present invention to provide a method and apparatus to provide such predictions.

SUMMARY OF THE INVENTION

According to the present invention, there is now provided a method of operating a data processing apparatus to process variables stored in an electronic database so as to provide predictions of future values of the variables, the method comprising the steps of;

accessing a prior distribution over the parameters of a first of the variables, accessing data values of the first variable to derive a posterior distribution of the parameters of the first variable, accessing a prior distribution over the parameters of a second of the variables, the second of the variables being correlated with the first, accessing data values of the second variable to derive a posterior distribution of the parameters of the second variable, taking statistical samples of the parameters of each posterior distribution to provide estimates of the parameters of the posterior distributions, computing a predictive distribution of the first variable from the said estimates, computing a predictive distribution of the second variable from the said estimates, and formulating predicted data values for the first and second correlated variables from the said predictive distributions and known values for the variables.

Further according to the present invention, there is provided data processing apparatus to process variables stored in an electronic database so as to provide predictions of future values of the variables, the apparatus comprising;

means to access a prior distribution over the parameters of a first of the variables, means to access data values of the first variable to derive a posterior distribution of the parameters of the first variable, means to access a prior distribution over the parameters of a second of the variables, the second of the variables being correlated with the first, means to access data values of the second variable to derive a posterior distribution of the parameters of the second variable, a statistical sampler of the parameters of each posterior distribution to provide estimates of the parameters of the posterior distributions, computing means to compute a predictive distribution of the first variable and a predictive distribution of the second variable from the said estimates, and a predictor to predict data values for the first and second correlated variables from the said predictive distributions and known values for the variables.

BRIEF DESCRIPTION OF THE DRAWINGS

The invention will now be described further, by way of example, with reference to the accompanying drawings in which.

DETAILED DESCRIPTION

Figure 1:
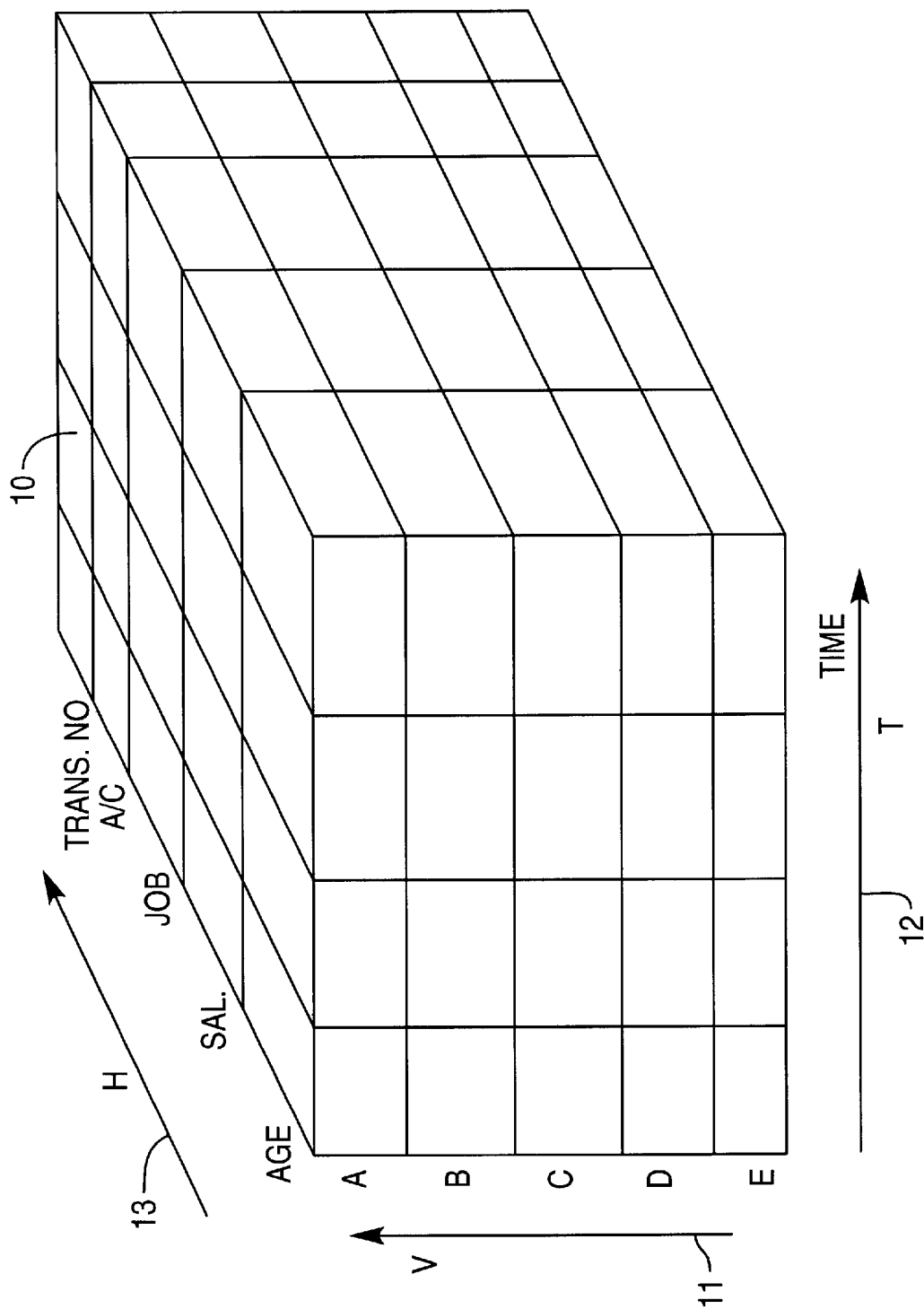
FIG. 1 is a diagram of a database of variables relating to a set of customers of a bank.

In FIG. 1, a database 10 concerns a set of customers of an enterprise such as a bank. The database 10 is shown in three dimensions arranged along a vertical axis 11, a horizontal axis 13 and a time axis 12. The vertical axis 11 is subdivided to include fields for each of five customers A to E although it will be understood that in practice the database would have fields along the vertical axis for a multiplicity of customers far in excess of five. Each customer has attributes that include personal information such as age, type of job and salary and financial attributes such as the number and types of bank accounts, including investment accounts, deposit and current accounts and holdings of credit cards. The data in the database includes data values relating to quantifiable items such as the balance in each account, the number of transactions in each account, the number of credit card transactions and so on. The data values in the database constitute variables some of which are continuous variables and others of which are discrete variables. The balance in a bank account is an example of a continuous variable and the number of credit card transactions per month is an example of a discrete variable.

The customer attributes are arranged along the horizontal axis 13. Whilst only five fields of attributes for each customer are shown in FIG. 1, it will be understood that, in practice, provision would be made for a number of attributes for each customer far in excess of five.

The time axis 12 of the database shows that the customer attributes are recorded as a succession of values at regular time intervals. The time intervals can conveniently be intervals of one month although intervals other than monthly intervals may be used. A portion of the entry for a customer A is illustrated in the following table A. The table A includes fields relating to age, salary and transactions in a current account including the number of ATM transactions, the balance and the settlement of a visa credit card bill. A table B illustrates the corresponding fields for a customer B.

TABLE A

| Month | Salary | Age | ATM Transact | Account Balance | Visa Bill |
|---|---|---|---|---|---|
| 1 | 43 000 | 43.083 | 4 | 1100.44 | 209.34 |
| 2 | 43 000 | 43.167 | 7 | 980.17 | 117.62 |
| 3 | 43 000 | 43.250 | 7 | 100.69 | 430.22 |
| 4 | 44 000 | 43.333 | 3 | 800.35 | 83.14 |
| 5 | 44 000 | 43.417 | 8 | 719.88 | 11.29 |

TABLE B

| Month | Salary | Age | ATM Transact | Account Balance | Visa Bill |
|---|---|---|---|---|---|
| 1 | 21 000 | 23.083 | 14 | 23.08 | 37.89 |
| 2 | 21 000 | 23.167 | 17 | 125.78 | 98.10 |
| 3 | 21 000 | 23.250 | 13 | 77.89 | 44.56 |
| 4 | 21 000 | 23.333 | 12 | 212.34 | 23.14 |
| 5 | 22 000 | 23.417 | 21 | 198.19 | 77.75 |

The tables A and B are illustrative of five fields along the horizontal axis of the database 10 in FIG. 1 to show the time progression on a monthly basis of the variables referred to. Other fields could refer for example to payments of interest payable by the customer in respect of loan accounts or payments to the customer in respect of a deposit account.

Banks have developed profitability algorithms to calculate the profit from each of their customers. The algorithm takes account of continuous variables such as the balance in an account and discrete variables such as the number of times an ATM has been used to conduct transactions. The profitability algorithm may not take into account variables such as the age of a customer that do not contribute directly to a determination of profit. For simplicity the profitability algorithm may be described as taking only two variables X and Y into account and be of the general form;

$$v(t)=G(X(t),Y(t))$$

In regard to customer A whose variables are shown as the succession of data values in Table A, the continuous variable X may be the account balance in Table A and the discrete variable Y may be the number of ATM transactions in Table A. Other variables Z such as age or sex are not included in the profitability algorithm because they do not contribute directly to the calculation of profit. If future values for the variables X and Y of a customer can be predicted at a future time (t+1), the future profitability of the customer can be calculated from the predicted values inserted into the profitability algorithm. Similar considerations apply to customer B whose attributes are shown in Table B.

The present invention is based on the realization that use can be made of the correlation between customer attributes to obtain accurate predictions of the variables X, Y and Z. Two attributes are said to be correlated if the variable value of one affects the value of the other and vice versa. A customer with a higher bank balance can be expected to make more credit card transactions than a customer with a lower bank balance for example. Here the continuous variable of bank balance in an account is correlated with the discrete variable of the number of credit card transactions. Correlations can be found between two continuous variables, two discrete variables as well as between a continuous and a discrete variable and the present invention is not limited to the type of variables that are correlated. The correlation between the different variables will be referred to as the correlation structure and each variable which is correlated with one or more other variables will be referred to as a covariate.

The posterior predictive distributions for each covariate are given by;

$$X(t+1) \sim p(X(t+1)|X(t),Y(t),Z(t+1))$$
$$Y(t+1) \sim p(Y(t+1)|X(t+1),Y(t),Z(t+1))$$
$$X(t+2) \sim p(X(t+2)|X(t+1),Y(t+1),Z(t+2)) \qquad (2)$$

The expressions (2) indicate that the predictive distribution of a covariate X at time (t+1) given that we are at time t, (i.e.

one step ahead in the succession of time intervals in the database of FIG. 1) is conditional on the most current values of the covariates. If this predictive distribution can be obtained, then a value for X(t+1) can be predicted and this predicted value can be used to predict a value for Y(t+1). The predicted value for X(t+1) will typically be given by its expectation.

This process can be continued for all the covariates in the database and the predicted profit at time t+1 can then be calculated from the profitability algorithm using the predicted values of the covariates at time t+1. To predict values of the covariates at future times t+2, t+3 and so on, the process of prediction may be repeated the required number of times. The predicted profit at these future times may be calculated from the profitability algorithm using the appropriate predicted values of the covariates. Of course, the further into the future the predictions go, the less certain the predictions become (i.e. the greater the variance).

The expressions (2) make the implicit assumption that the covariates exhibit Markovian properties, that is to say that the value of a covariate at the nth step is dependent only on its value at the (n−1)th step and not on any previous values. The invention is not limited to covariates exhibiting Markovian properties and may be extended to take the values at earlier time points into account.

Figure 2:
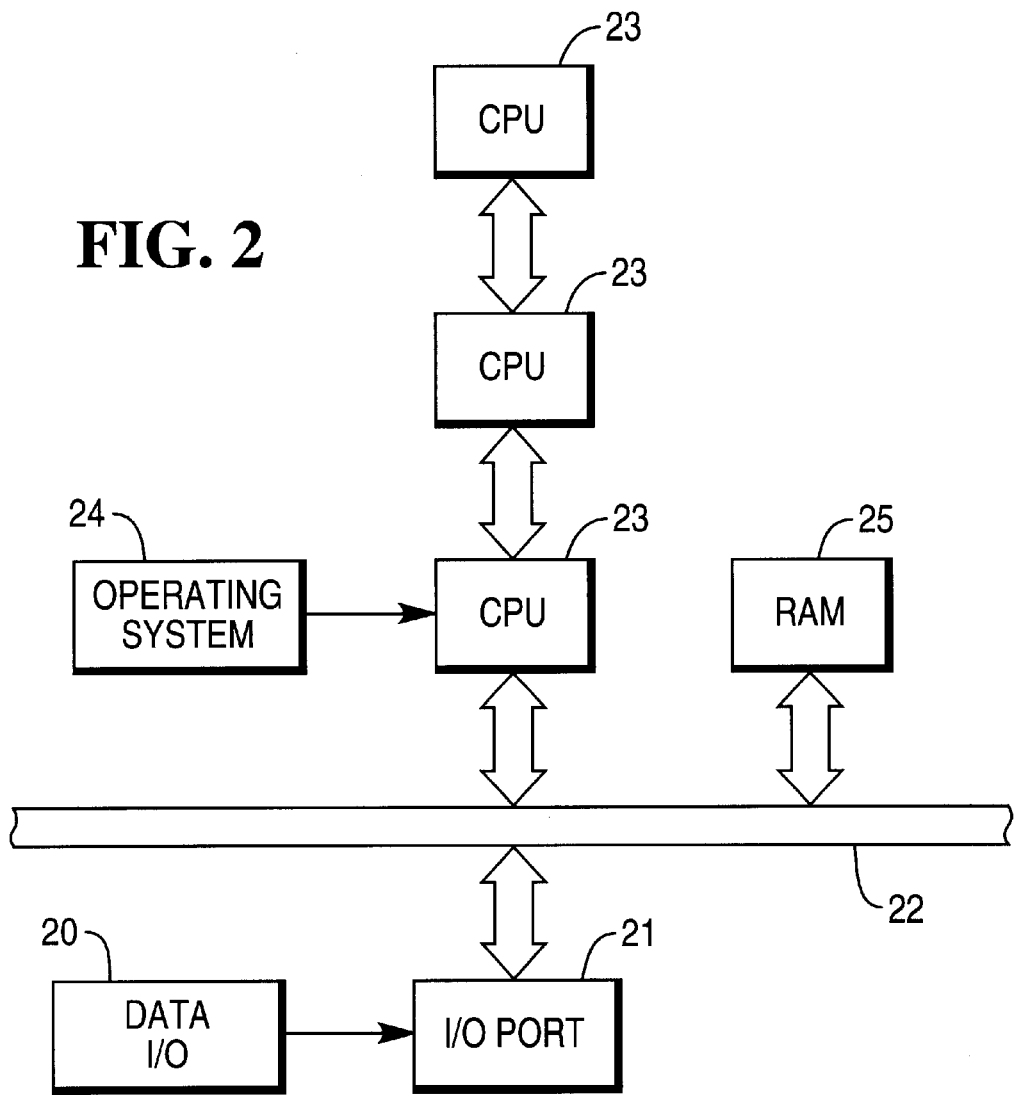
FIG. 2 shows data processing apparatus, according to the present invention, for predicting future values of the variables stored in the database of FIG. 1.

The distributions and the parameters in the expressions (2) may be modeled by first assuming that continuous variables such as X follow a normal distribution and discrete variables such as Y follow a Poisson distribution. For the simplified example described so far, the parameters of the distributions can be described by the relationships;

$$E[X(t+1)]=f_x(X(t),Y(t),Z(t+1))$$

$$E[Y(t+1)]=f_y(X(t+1),Y(t),Z(t+1))$$

$$E[X(t+2)]=f_x(X(t+1),Y(t+1),Z(t+2)) \quad (3)$$

and the functional forms $f_x$ and $f_y$ are given by $$X(t+1) \sim \text{Normal}(\mu(t),\sigma^2),$$

where $\mu(t)=\alpha_\mu+\beta_\mu X(t)+\gamma_\mu Y(t)+\delta_\mu Z(t)$ and $Y(t+1) \sim \text{Poisson}(\lambda(t))$ where $\lambda(t)=\alpha_\lambda+\beta_\lambda X(t+1)+\gamma_\lambda Y(t)+\delta_\lambda Z(t)$ Referring now to FIG. 2, a data processing apparatus is shown that provides a means for receiving the data in the database of FIG. 1. The data is entered by means of an I/O device 20 through an I/O port 21 for entry to a data bus 22. A group of central processing units (CPU) 23 are controlled by an operating system 24 to control the entry of data onto the data bus. A random access memory 25 is connected to the I/O bus 22 to receive and store data supplied by the bus 22.

In response to the entry, by means of the data I/O device 20, of the data representing the information in the different fields of the database 10 of FIG. 1, the parallel operating CPU's are programmed to enter the data into the memory 25. The data in the memory 25 is a set of data values representing each of the variables for each of the customers included in the database. The data are available to be processed in a series of processing operations as represented in the block flow diagram of FIGS. 3A and 3B.

Figure 3A:
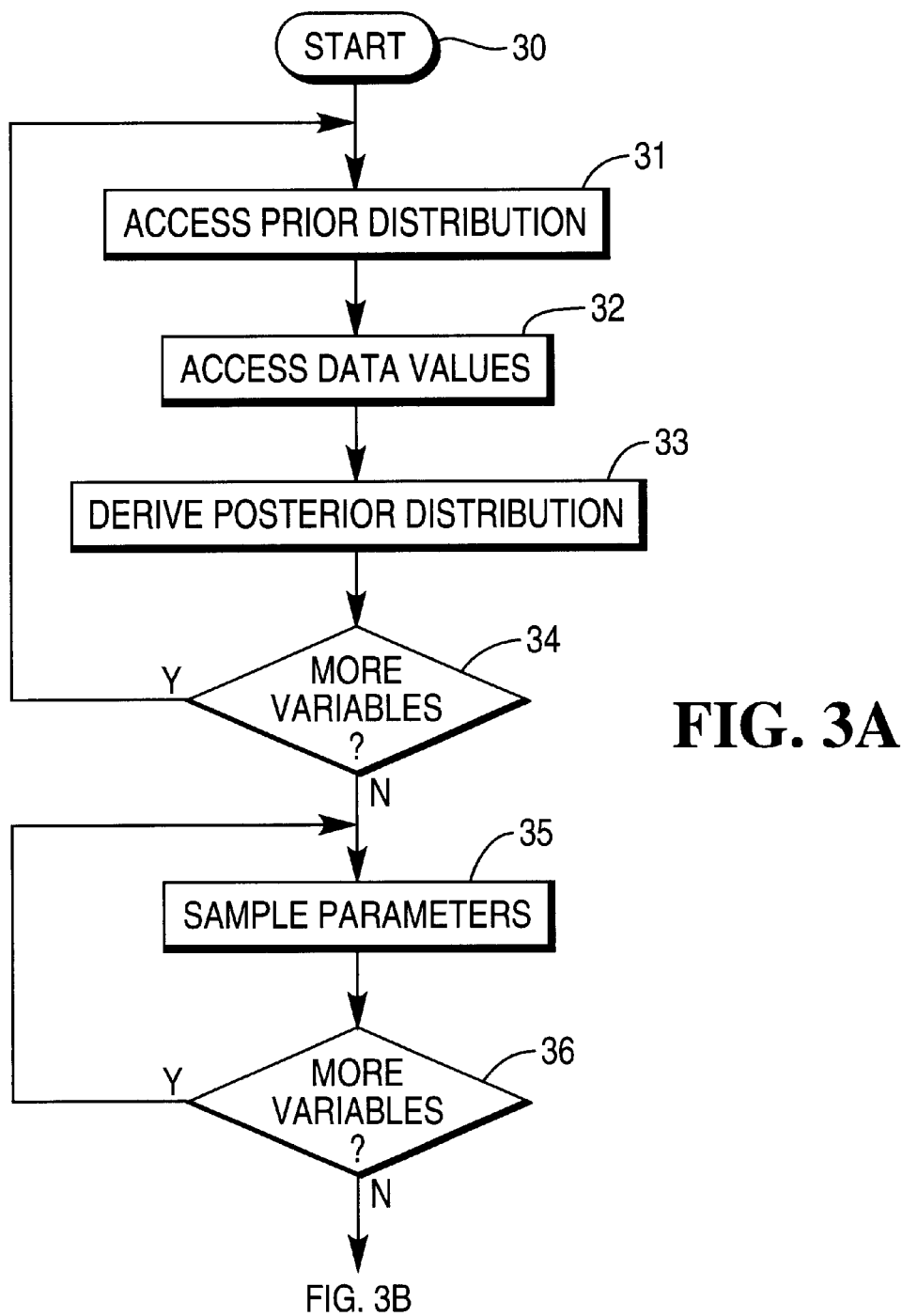
FIGS. 3A and 3B shows operating steps in a method according to the present invention that employs the apparatus of FIG. 2.
Figure 3B:
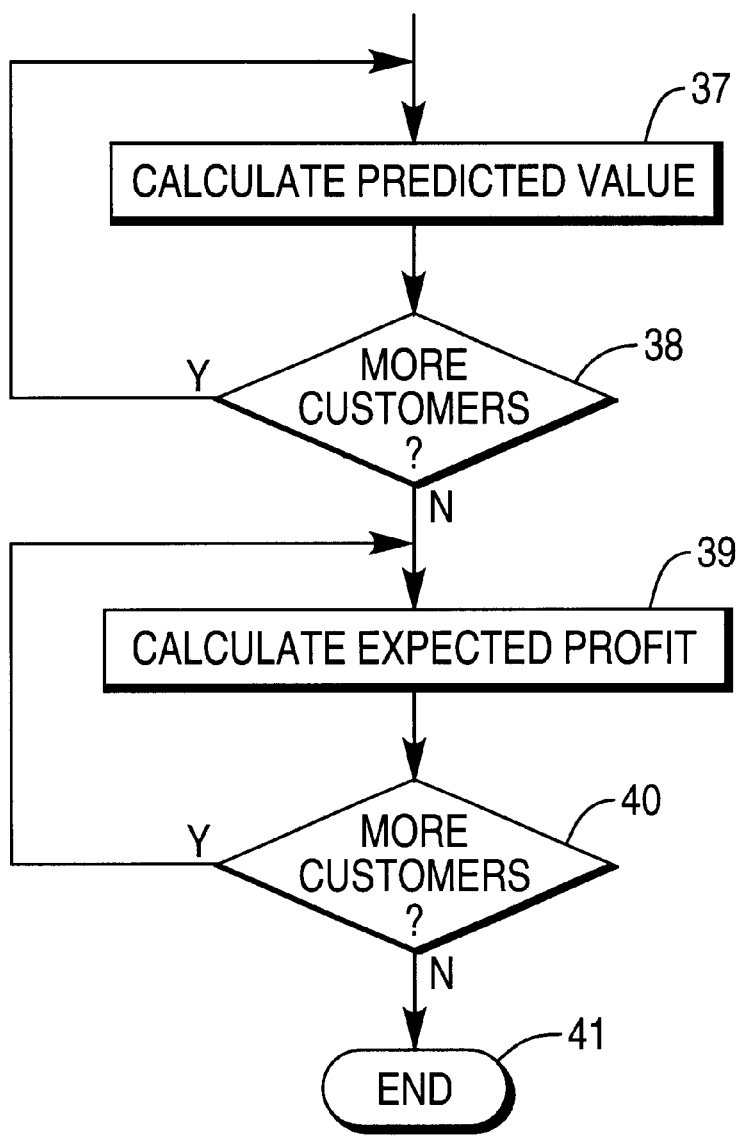

In FIG. 3A, the process begins at the start 30 and proceeds to a step 31 in which, working within a Bayesian framework, a prior distribution over the parameters of a first of the variables is specified and accessed. If the first variable is a continuous variable, the parameters are those of $\mu(t)=\alpha_\mu+\beta_\mu X(t)+\gamma_\mu Y(t)+\delta_\mu Z(t)$. If the first variable is a discrete variable, the parameters are those of $\lambda(t)=\alpha_\lambda+\beta_\lambda X(t+1)+\gamma_\lambda Y(t)+\delta_\lambda Z(t)$. The prior distribution covers all the customers in the database. In the following step 32 the data values of the first variable are accessed up to the most current value at time t so as to derive in step 33 a posterior distribution over the parameters of the first variable. A test is conducted in step 34 to determine whether a posterior distribution has been derived for all the variables. If not, the process reverts to step 31 for the next variable until all the variables that contribute to the profitability algorithm of the bank have been dealt with.

If there are no more variables to be dealt with in connection with steps 31 to 33, the decision in step 34 will take the process to step 35. In step 35 statistical samples of the parameters of the posterior distribution of the first variable are taken to provide estimates of the parameters. The samples may be taken using the known Markov Chain Monte Carlo (MCMC) sampler e.g. a Gibbs sampler. A test is taken in step 36 to determine whether there are samples to be taken for further variables. If there are more samples to be taken, the process loops round to step 35. By this means, parameter sampling continues until the samples for all of the continuous variables and all of the discrete variables have been taken.

The estimates of the parameters provide the posterior predictive distributions of equations (2). Continuing into FIG. 3B, the process continues into step 37 where a calculation is made of the predicted values of the variables for an individual customer at time as t+1 using the parameter samples and the data values for that customer as represented in equations (3). The predictions are computed for each customer until the test in step 38 indicates that all the customers have been dealt with.

Continuing into step 39, the profit expected for an individual customer is calculated from the profitability algorithm at time t+1 using the predicted values for that customer of each variable. The profit for each customer is computed in turn until a test in step 40 indicates that the profit for all of the customers has been calculated. The step 41 indicates the end of the process.

The predictions in step 37 may be extended beyond time t+1 to succeeding time points t+2, t+3 and so on. The predictions can then be used in step 39 to calculate profit at these succeeding time points. It will be appreciated that the predictions in step 37 and the calculations in step 40 become less certain the further into the future the predictions are made.

What has been described is a method and apparatus for providing predictions of future values of the variables in the database. Whilst the predictions have been described as providing the input to the calculation of profitability, they may be seen to be useful in their own right as extrapolations into the future from known values of individual variables. Furthermore the predictions may be useful to calculate results other than profitability, for example to plan the resources needed by the bank to service individual customers. The invention may use functions other than those described for $\mu$ and $\lambda$ such as functions with squared or exponential terms for example and may use distributions other than those specifically described.

Working within a Bayesian framework requires prior distributions to be specified for the unknown parameters. One class of prior that could be used is the Dirichlet process prior. The Dirichlet process essentially splits the database into distinct clusters of similar customers and a separate analysis can be performed to predict values in relation to each cluster. In essence the modeling process at each step would be local to each cluster. Other clustering techniques are available to perform local modeling and may be preferred to the Dirichlet process by reason of computational efficiency.

What is claimed is:

1. A method of operating a data processing apparatus to process variables stored in an electronic database so as to provide prediction of future values of the variables, the method comprising the steps of:

accessing a prior distribution over the parameters of a first of the variables;

accessing data values of the first variable to derive a posterior distribution of the parameters of the first variable;

accessing a prior distribution over the parameters of the second of the variables, the second of the variables being correlated with the first;

accessing data values of the second variable to derive a posterior distribution of the parameters of the second variable;

taking statistical samples of the parameters of each posterior distribution to provide estimates of the parameters of the posterior distributions of each of the first and the second variables;

computing a predictive distribution of the first variable from said estimates, both the estimate of the parameters of the posterior distribution of the first variable and the estimate of the parameters of the posterior distribution of the second variable being used in computing the predictive distribution of the first variable;

computing a predictive distribution of the second variable from the said estimates, both the estimate of the parameters of the posterior distribution of the first variable and the estimate of the parameters of the posterior distribution of the second variable being used in computing the predictive distribution of the second variable; and formulating predicted data values for the first and second correlated variables from said predictive distributions and known values for the variables.

2. A method as claimed in claim 1, wherein the first variable is a continuous variable and the prior distribution over the parameters of the first variable is a normal distribution.

3. A method as claimed in claim 1, wherein the second variable is a discrete variable and the prior distribution over the parameters of the second variable is a Poisson distribution.

4. A method as claimed in claim 1, wherein the first variable comprises a personal attribute of individuals represented in the database and the second variable concerns transactions made by the individuals and the method comprises the further step of calculating profitability from the predicted data values of the first and second correlated variables.

5. A method of operating a data processing apparatus to process variables stored in an electronic database so as to provide prediction of future values of the variables, the method comprising the steps of:

accessing a prior distribution over the parameters of a first plurality of the variables, the first plurality of the variables, the first variables being continuous variables;

accessing data values of the first variables to derive a posterior distribution of the parameters of the first variables;

accessing a prior distribution over the parameters of a second plurality of the variables, the second variables being discrete variables correlated with the first variables;

accessing data values of the second variables to derive a posterior distribution of the parameters of the second variables;

taking statistical samples of the parameters of each posterior distribution to provide estimates of the parameters of the posterior distributions of each of the first and the second plurality of variables;

computing a predictive distribution of the first variables from said estimates, both the estimate of the parameters of the posterior distribution of the first variables and the estimate of the parameters of the posterior distribution of the second variables being used in computing the predictive distribution of the first variables;

computing a predictive distribution of the second variables from said estimates, both the estimate of the parameters of the posterior distribution of the first variables and the estimate of the parameters of the posterior distribution of the second variables being used in computing the predictive distribution of the second variables; and formulating predicted data values for the first and second correlated variables from said predictive distributions and known values for the variables.

6. Data processing apparatus to process variables stored in an electronic database so as to provide prediction of future values of the variables, the apparatus comprising:

means for accessing a prior distribution over the parameters of a first of the variables;

means for accessing data values of the first variable to derive a posterior distribution of the parameters of the first variable;

means for accessing a prior distribution over the parameters of a second of the variables, the second of the variables being correlated with the first;

means for accessing data values of the second variable to derive a posterior distribution of the parameters of the second variable;

a statistical sampler of the parameters of each posterior distribution for providing estimates of the parameters of the posterior distributions of each of the first and the second variables;

computing means for computing a predictive distribution of the first variable and a predictive distribution of the second variable from the said estimates, the computing means employing both the estimate of the parameters of the posterior distribution of the first variable and the estimate of the parameters of the posterior distribution of the second variable to compute the predictive distribution of the first variable, the computing means further employing both the estimate of the parameters of the posterior distribution of the first variable and the estimate of the parameters of the posterior distribution of the second variable to compute the predictive distribution of the second variable; and a predictor for predicting data values for the first and second correlated variables from said predictive distributions and known values for the variables.

7. Apparatus as claimed in claim 6, wherein the first variable is a discrete variable and the prior distribution over the parameters of the first variable is a Poisson distribution.

8. Apparatus as claimed in claim 6, wherein the second variable is a discrete variable and the prior distribution over the parameters of the second variable is a Poisson distribution.

9. Apparatus as claimed in claim 6, wherein the first variable comprises a personal attribute of individuals represented in the database and the second variable concerns transactions made by the individuals, the apparatus further comprising profitability calculating means for calculating profitability from the predicted data values of the first and second correlated variables.

10. Data processing apparatus to process variables stored in an electronic database so as to provide prediction of future values of the variables, the apparatus comprising:

means for accessing a prior distribution over the parameters of a first plurality of the variables, the first variables being continuous variables;

means for accessing data values of the first variables to derive posterior distributions of the parameters of the first variables;

means for accessing prior distributions over the parameters of a second plurality of the variables, the second variables being discrete variables correlated with the first;

means for accessing data values of the second variables to derive posterior distributions of the parameters of the second variables;

a statistical sampler for sampling the parameters of each posterior distribution for providing estimates of the parameters of the posterior distributions of each of the first and the second plurality of variables;

computing means for computing a predictive distribution of the first variables and a predictive distribution of the second variables from said estimates, the computing means employing both the estimate of the parameters of the Posterior distribution of the first variables and the estimate of the parameters of the posterior distribution of the second variables to compute the predictive distribution of the first variables, the computing means further employing both the estimate of the parameters of the Posterior distribution of the first variables and the estimate of the parameters of the posterior distribution of the second variables to compute the predictive distribution of the second variables; and a predictor for predicting data values for the first and second correlated variables from said predictive distributions and known values for the variables.

11. The method of claim 1, wherein the first and second variables relate to attributes associated with a customer of a commercial establishment.

12. The method of claim 11, wherein the attributes relate to account characteristics of a bank customer.

13. The method of claim 12, wherein the first and second variables relate to the profitability of the customer's activity to the establishment.

14. The method of claim 13, wherein at least one of the first and second variables relates to transactions undertaken by the customer.

15. The method of claim 5, wherein the first and second pluralities of variables relate to attributes associated with a customer of a commercial establishment.

16. The method of claim 15, wherein the attributes relate to account characteristics of a bank customer.

17. The method of claim 16, wherein the first and second pluralities of variables relate to the profitability of the customer's activity to the establishment.

18. The method of claim 17, wherein at least one variable of the first and second pluralities of variables relates to transactions undertaken by the customer.

* * * * *

UNITED STATES PATENT AND TRADEMARK OFFICE
CERTIFICATE OF CORRECTION

PATENT NO.   : 6,725,210 B1
DATED        : April 20, 2004
INVENTOR(S)  : Key, J. and Tan, S. B.

It is certified that error appears in the above-identified patent and that said Letters Patent is hereby corrected as shown below:

Column 7,
Line 33, after "from" delete "the".

Column 8,
Line 48, after "from" delete "the".

Signed and Sealed this

Twentieth Day of July, 2004

JON W. DUDAS
*Acting Director of the United States Patent and Trademark Office*